United States Patent Office 3,054,823
Patented Sept. 18, 1962

3,054,823
PRODUCTION OF ARYLOXY FATTY ACIDS
Tim Toepel, Ludwigshafen, (Rhine), Germany, assignor to Badische Anilin- & Soda-Fabrik Aktiengesellschaft, Ludwigshafen (Rhine), Germany
No Drawing. Filed May 18, 1959, Ser. No. 813,651
Claims priority, application Germany May 29, 1958
3 Claims. (Cl. 260—521)

This invention relates to a process for the production of aryloxy fatty acids from phenols and halogen fatty acids in aqueous solution.

It is known that aryloxy acetic acids can be prepared by reacting the corresponding alkali phenolates with the sodium salt of chloracetic acid in aqueous solution. The reaction, however, is not very successful if higher chlorofatty acids are used instead of chloracetic acid.

It is also known that diaryloxy fatty acids can be obtained by reacting phenolates with dihalogen fatty acids or their salts in an organic solvent in the absence of water. The production of anhydrous phenolates, however, is difficult and in some cases even hardly possible at all.

There is therefore a demand for a process according to which aryloxy fatty acids with at least three carbon atoms in the aliphatic radical can be prepared in good yields by reacting phenols with halogen fatty acids in aqueous solution.

I have now found that aryloxy fatty acids with at least three carbon atoms in the aliphatic radical are obtained in a simple way and with good yields by reacting a phenol with a halogenated fatty acid at elevated temperature in an aqueous alkali hydroxide solution and in the presence of an aliphatic or cycloaliphatic alcohol with at least three carbon atoms which is volatile with steam.

Suitable phenols are those mononuclear or dinuclear carbocyclic aromatic compounds bearing a nuclear-combined hydroxyl group. They may also contain indifferent substituents such as lower alkyl groups with up to about five carbon atoms and halogen atoms, especially bromine or chlorine atoms. Of the suitable phenols there may be given as examples: phenol, ortho-cresol, meta-cresol-, para-cresol, mixtures of the isomeric cresols and xylenols, alpha- and beta-naphthol, 2-chlorphenol, 4-chlorphenol, 2,4-dichlorphenol, 2,4,6-trichlorphenol, 2,4,5-trichlorphenol, 4-bromophenol, 2-methyl-4-chlorphenol, 2-methyl-4,6-dichlorphenol, 2-methyl-4-bromophenol, 4-chlor-alpha-naphthol, 4-isopropylphenol, 2-chlor-4-ethylphenol, 2-bromo-4,6-dimethylphenol, 4-secondary-pentylphenol and 2-bromo-4-isobutylphenol.

Halogenated fatty acids suitable for the process according to my invention contain three to about twenty carbon atoms. They may be saturated or unsaturated, linear or branched. The brominated and especially the chlorinated fatty acids are preferred. Fatty acids which contain iodine atoms may in many cases be used for the process, but are less desirable by reason of their more difficult accessibility. The halogen atoms may be situated in any position to the carboxylic group. It is especially advantageous, however, to use alpha-halogen, especially alpha-chlor-fatty acids of saturated aliphatic carboxylic acids with three to six carbon atoms. Suitable halogen fatty acids are, inter alia: alpha-chlorpropionic acid, alpha-bromopropionic acid, beta-chlorpropionic acid, beta-bromopropionic acid, alpha-chlorbutyric acid, alpha-chlorvaleric acid, alpha-bromovaleric acid, gamma-chlorbutyric acid, delta-chlorvaleric acid, alpha-bromocaproic acid, epsilon-chlorcaproic acid, alpha-chlor-alpha-ethylhexanoic acid, alpha-chlorcaprylic acid, alpha-bromocaproic acid, omega-bromundecanoic acid, alpha-bromolauric acid, alpha-bromomyristic acid, alpha-chlorpalmitic acid, 9-bromoctadecanoic acid-(1), 10-bromoctadecanoic acid-(1) and alpha-bromostearic acid.

The most favorable reaction temperatures lie above 70° C. and especeially between 90° and 110° C.

It is advantageous to use sodium hydroxide or potassium hydroxide in the form of a high percentage aqueous solution, generally an aqueous solution of 40 to 60% strength.

The aliphatic or cycloaliphatic alcohols volatile with steam, in the presence of which the reaction is to be carried out, contain one hydroxyl group and at least three and as a rule up to a maximum of ten carbon atoms. They may be primary, secondary or tertiary alcohols, saturated or unsaturated and, if they are aliphatic, may be linear or branched. Examples of suitable alcohols are propanol, isopropanol, allyl alcohol, butanol, isobutanol, tertiary butyl alcohol, normal amyl alcohol, isoamyl alcohol, normal hexanol, hexanol-(2), cyclopentanol, cyclohexanol, cyclohexene-(2)-ol-(1), 2-ethylhexanol and normal nonanol. Aliphatic alcohols with 4 and 5 carbon atoms are preferred.

In general, the reaction is carried out by mixing the phenol and the halogen fatty acid in a stirring vessel. The initial materials may be used in stoichiometric amounts. It is preferable however, to use one of the components in excess, for example 10 to 30% of phenol more than the theoretical amount. To this mixture there is then added the alcohol, generally in amounts of 20 to 200% by weight, advantageously 60 to 150% by weight, with reference to the phenol, and then the alkali solution is allowed to flow in during the course of a few hours. At least such an amount of alkali solution is added to the mixture as is necessary for neutralization of the halogen fatty acid and for formation of the alkali phenolate. In some cases however it is recommendable to use an excess of alkali hydroxide, for example of 15%. During the addition of the alkali solution, the mixture heats up and is kept at the desired reaction temperature by cooling or additional heating if necessary. After the mixture has been cooled, an amount of acid is added such as is required for neutralization of the excess alkali hydroxide and for setting free the excess phenol, and the alcohol and unreacted phenol are removed in a current of steam. It will be obvious to the expert that any acid may be used which is stronger than the aryloxy fatty acid formed, but it is advantageous to use strong mineral acids, such as hydrochloric acid and sulfuric acid. The distillate, which is poor in water, may be used for a fresh batch after its content of phenol has been determined. From the residual solution of the alkali salt of the aryloxy fatty acid, the acid is set free by acidification, again advantageously with a mineral acid.

For the production of aryloxy fatty acids chlorinated in the benzene nucleus, it is possible to start from the corresponding chlorphenols, but in many cases they are obtained equally well by reacting the phenol free from chlorine with the chlorfatty acid and then chlorinating the aryloxy fatty acid in the way hereinafter described in Example 1.

According to the new process, even with the higher chlorfatty acids, yields are obtained which are comparable with those of aryloxy acetic acids obtained from chlor-acetic acid. On the other hand if the process using aqueous caustic soda solution without the addition of an alcohol, which gives quite good yields for aryloxy acetic acids, is used, the yields are greatly diminished. As compared with methods which start from alkali phenolates, the process according to this invention has the advantage that it is possible to work in one stage without having first to prepare dry phenolate.

The following are examples of aryloxy fatty acids which can be prepared according to this invention: 2-(para-chlor-ortho-cresoxy)-propionic acid, 2-(para-chlor-ortho-cresoxy)-butyric acid, 2-(2',5'-dichlorphenoxy)-propionic acid, 2-(2',4',5'-trichlorphenoxy)-propionic acid. They are good weed killers.

The following examples will further illustrate this invention but the invention is not restricted to these examples. The parts given in the examples are parts by weight.

Example 1

445 parts of ortho-cresol, 525 parts of isobutanol and 350 parts of alpha-chlorpropionic acid are mixed and then 665 parts of a 50% solution of caustic soda gradually added, the temperature thereby rising to about 100° C. The mixture is kept at this temperature for 2 hours. The reaction mass is diluted with water, 240 parts of a 45% sulfuric acid are added and the isobutanol and ortho-cresol are removed by steam distillation. 165 parts of ortho-cresol are recovered.

The resultant solution of the sodium salt of cresoxy-propionic acid has 270 parts of 45% sulfuric acid and 1925 parts of a 12 to 14% solution of sodium hypochlorite added thereto and the whole is stirred for 2 hours. It is then adjusted to pH 3 with 45% sulfuric acid, cooled, filtered and washed with water, 500 parts of 2-(para-chlor-ortho-cresoxy)-propionic acid are obtained.

Example 2

918 parts of ortho-cresol, 1090 parts of butanol, 834 parts of alpha-chlorbutyric acid are heated to 55° C. 1223 parts of a 50% aqueous caustic soda solution are gradually added to the mixture, the temperature thereby rising to 107° C. The mixture is kept at this temperature for 3 hours. After adding 600 parts of water, 180 parts of a 45% sulfuric acid are added and the solvent and unreacted cresol distilled off with steam. 180 parts of ortho-cresol are recovered. The distillation residue is acidified with 700 parts of 45% sulfuric acid. 1120 parts of 2-(ortho-cresoxy)-butyric acid are obtained.

Example 3

625 parts of a 50% caustic soda solution are introduced while stirring into a mixture of 445 parts of ortho-cresol, 525 parts of cyclohexanol and 350 parts of alpha-chlorpropionic acid. The temperature of the mixture rises to about 100 ° C. and this temperature is maintained for 4 hours. The liquid has a pH of 10.9. The mixture is diluted with 500 parts of water, adjusted to pH 5.4 with 240 parts of 45% sulfuric acid and freed from cyclohexanol and unreacted ortho-cresol by steam distillation. 510 parts of a mixture of cyclohexanol and ortho-cresol are recovered. The resulting solution of the sodium salt of alpha-(ortho-cresoxy)-propionic acid is cooled to room temperature and adjusted to pH 3 by adding 45% sulfuric acid while stirring, alpha-(ortho-cresoxy)-propionic acid thereby being precipitated. By filtration, washing with water and drying, 460 parts of this acid are obtained.

Example 4

670 parts of 2,4-dichlorphenol and 350 parts of alpha-chlorpropionic acid are dissolved in 525 parts of 2-ethyl-hexanol. 625 parts of 50% caustic soda solution are then added to the solution while stirring, the pH rising to 9.5 and the temperature to about 100° C. The mixture is kept at this temperature for 4 hours, then diluted with 500 parts of water and the pH adjusted to 5.2 by adding 240 parts of 45% sulfuric acid. Steam is then passed through the mixture until the whole of the ethyl hexanol and unreacted 2,4-dichlorphenol has been driven off. 746 parts of ethyl hexanol and 2,4-dichlorphenol are recovered. The residue is allowed to cool to about 30° C. and the pH is adjusted to 3.0 by adding 45% sulfuric acid while stirring. 550 parts of alpha-(2,4-dichlorphenoxy)-propionic acid are obtained.

Example 5

814 parts of 50% caustic potash solution are added to a solution of 380 parts of phenol and 350 parts of alpha-chlorpropionic acid in 525 parts of isoamyl alcohol, the pH thereby rising to 10.8 and the temperature to 100° C. The solution is stirred at this temperature for 5 hours, then diluted with 500 parts of water and the pH adjusted to 5.1 by adding 45% sulfuric acid. The isoamyl alcohol and unreacted phenol are expelled with steam. The residue is allowed to cool and alpha-phenoxy-propionic acid precipated by adding 45% sulfuric acid and setting up a pH of 3.0. 218 parts of the said acid having the melting point 112° C. are obtained by filtering off, washing with water and drying.

Example 6

762 parts of 50% caustic potash solution are added to a mixture of 433 parts of 2,4-dimethyl phenol, 350 parts of alpha-chlorpropionic acid and 550 parts of n-propanol, the pH thereby rising to 10.9 and the temperature to 97° C. The mixture is kept at this temperature for 5 hours and then diluted with 500 parts of water. After adding 240 parts of 45% sulfuric acid, n-propanol and unreacted 2,4-dimethyl phenol are expelled with steam. The residue is allowed to cool and alpha-(2,4-dimethylphenoxy)-propionic acid precipitated by adding 45% sulfuric acid. There are obtained 440 parts of the said acid having the melting point 87° C.

Example 7

700 parts of 2,4,5-trichlorphenol and 350 parts of alpha-chlorpropionic acid are dissolved in 800 parts of isoamyl alcohol. 622 parts of 50% caustic soda solution are added to this solution while stirring, the pH thereby being adjusted to 9.5 and the temperature rising to just over 100° C. The whole is stirred at this temperature for 6 hours and then 500 parts of water and 240 parts of 45% sulfuric acid are added, the pH dropping to 5.3. The isoamyl alcohol and unreacted 2,4,5-trichlorphenol are removed with steam. The residual mixture is cooled and the pH adjusted to 3.0 by adding 45% sulfuric acid while stirring, alpha-(2,4,5-trichlorphenoxy)-propionic acid thereby being precipitated. My filtration and washing with water, 600 parts of the said acid of the melting point 176° C. are obtained.

Example 8

626 parts of a 50% caustic soda solution are added to a mixture of 417 parts of beta-naphthol, 400 parts of alpha-chlorpropionic acid and 600 parts of isoamyl alcohol, the pH thereby rising to 10.5. The mixture is kept boiling under reflux for 6 hours at just over 100° C. Then 500 parts of water and 185 parts of 45% sulfuric acid are added, the pH dropping to 5.2. The isoamyl alcohol is driven off with steam and 563 parts are recovered as top layer. The mixture which has been freed from isoamyl alcohol is cooled and the pH adjusted to 2.7 by adding 45% sulfuric acid. Alpha-(betanaphthoxy)-propionic acid is thereby precipitated. By filtration, washing with water and drying, 600 parts of the said acid are obtained having the melting point 108° C. after recrystallization from water or benzene.

*Example 9*

600 parts of bromine are added at 70° C. under reflux to 400 parts of n-capronic acid, to which 6 parts of phosphorus trichloride have been added, and the mixture is kept at 100° C. for 6 hours. To the 660 parts of crude alpha-bromo-capronic acid thus obtained there are then added 540 parts of 2,4-dichlorphenol and 700 parts of isoamyl alcohol. By adding 500 parts of 50% caustic soda solution a pH of 9.5 is set up and the temperature rises to just over 100° C. The mixture is kept boiling under reflux for 4 hours at 106° C. It is then diluted with 500 parts of water and the pH adjusted to 5.0 by adding 184 parts of 45% sulfuric acid. The isoamyl alcohol and unreacted 2,4-dichlorphenol are removed with steam and 751 parts are recovered. The residue is cooled and the pH adjusted to 3.0 by adding 45% sulfuric acid while stirring. By filtration and drying, 750 parts of crude alpha-(2,4-dichlorphenoxy)-capronic acid are obtained. After recrystallization from benzene the melting point is 110° C.

*Example 10*

160 parts of 50% caustic soda solution are added while stirring to a solution of 212 parts of 2,4-dichlorphenol and 110 parts of beta-chlorpropionic acid in 400 parts of isoamyl alcohol, the pH thereby rising to 9.5 and the temperature to 100° C. The mixture is kept at this temperature for 2 hours. It is then diluted with 500 parts of water and the pH is adjusted to 5.1 by adding 130 parts of 45% sulfuric acid. The mixture of isoamyl alcohol and unreacted 2,4-dichlorphenol is removed with steam. The distillation residue is allowed to cool and beta-(2,4-dichlorphenoxy)-propionic acid is precipitated by adding 45% sulfuric acid up to pH 3.0. 90 parts of the said acid are obtained. After recrystallization from benzene its melting point is 94° C.

*Example 11*

6 parts of phosphorus trichloride are added to 400 parts of isovaleric acid and the whole is reacted under reflux at 100° C. with 690 parts of bromine. 738 parts of crude alpha-bromo-isovaleric acid are obtained.

369 parts of this acid are mixed with 240 parts of phenol and 360 parts of isoamylalcohol. 380 parts of 50% caustic soda solution are added, the pH rising to 10.0 and the temperature to 108° C. The mixture is kept at this temperature for 7 hours, then diluted with 500 parts of water, the pH adjusted to 5.5 by adding 45% sulfuric acid and the isoamyl alcohol and unreacted phenol are removed by steam distillation. The residue is allowed to cool and the pH adjusted to 2.0 by adding 45% sulfuric acid while stirring. Crude alpha-phenoxy-isovaleric acid is thereby precipitated in the form of an oil solidifying upon standing. By filtration, washing with water and drying, the said acid is obtained in an amount of 170 parts. The needle-shaped crystals obtained by recrystallization from water have the melting point 82° C.

*Example 12*

369 parts of crude alpha-bromo-isovaleric acid (cf. Example 11) are dissolved in 400 parts of isoamyl alcohol together with 384 parts of 2,4-dichlorphenol and then 440 parts of 50% caustic soda solution are introduced, the pH rising to 10.0 and the temperature to 108° C. The mixture is kept at this temperature for 7 hours, then diluted with 500 parts of water and the pH adjusted to 5.5 by adding 45% sulfuric acid. The isoamyl alcohol and unreacted 2,4-dichlorphenol are removed by steam distillation. The residue is allowed to cool and the pH adjusted to 2.2 by adding 45% sulfuric acid. 300 parts of crude alpha-(2,4-dichlorphenoxy)-isovaleric acid are precipitated.

*Example 13*

600 parts of bromine are added under reflux and while stirring to a mixture of 26 parts of red phosphorus and 570 parts of stearic acid, the temperature being allowed to rist slowly from 70 to 100° C. After the bromine vapors have disappeared, the liquid is poured into water and washed until free from acid. The crude alpha-bromo-stearic acid is taken up in warm petroleum ether. After removing the petroleum ether 726 parts of the said acid are obtained.

363 parts thereof are dissolved in 500 parts of isoamyl alcohol together with 113 parts of phenol and then 224 parts of 50% caustic potash solution are added while stirring. The pH rises to 11.0 and the temperature to 104° C. The mixture is kept at this temperature for 6 hours, then diluted with 500 parts of water and the pH adjusted to 5.5 by adding 46% sulfuric acid. The isoamyl alcohol and unreacted phenol are removed by steam distillation. The residue is allowed to cool and the pH adjusted to 1.0 by adding 45% sulfuric acid while stirring. The solid portion is then separated from the aqueous solution by filtration and dried, 370 parts of crude alpha-phenoxy-stearic acid thereby being obtained. By recrystallization from petroleum ether there are obtained 238 parts of a beautifully crystalline product having the melting point 59° C.

*Example 14*

324 parts of 50% caustic potash solution are added to a solution of 363 parts of crude alpha-bromo-stearic acid (cf. Example 13) and 196 parts of 2,4-dichlorphenol in 300 parts of isoamyl alcohol, the pH rising to 10.0 and the temperature to 104° C. The mixture is kept at this temperature for 6 hours, then diluted with 500 parts of water, the pH adjusted to 5.4 by adding 45% sulfuric acid and the isoamyl alcohol and unreacted 2,4-dichlorphenol are removed by steam distillation. The residue is allowed to cool and the pH is adjusted to 1.0 by adding 45% sulfuric acid. The solid portion is separated from the aqueous solution and dried. 400 parts of crude alpha-(2,4-dichlorphenoxy)-stearic acid are obtained.

What I claim is:

1. A process for the production of aryloxy fatty acids which comprises mixing a phenol selected from the group consisting of phenol, phenols substituted by alkyl groups having from 1 to 5 carbon atoms, phenols substituted by chlorine atoms, phenols substituted by bromine atoms, phenols substituted by alkyl groups having from 1 to 5 carbon atoms and chlorine atoms, phenols substituted by alkyl groups having from 1 to 5 carbon atoms and bromine atoms, α-naphthol, β-naphthol, naphthols substituted by alkyl groups having from 1 to 5 carbon atoms, and naphthols substituted by chlorine atoms, with a halogenated fatty acid selected from the group consisting of chlorinated, brominated and iodinated fatty acids with 3 to 20 carbon atoms at a temperature between 70° and 110° C. in the presence of a solvent for said phenol selected from the group consisting of aliphatic and cycloaliphatic alcohols containing one hydroxyl group and from 3 to 10 carbon atoms, said alcohols being volatile with steam, and adding to said mixture an aqueous alkali hydroxide solution, the amount of said aqueous alkali hydroxide solution added to said mixture being at least enough to neutralize said halogenated fatty acid and thereby form the alkali phenolate.

2. A process for the production of aryloxy fatty acids which comprises mixing a phenol selected from the group consisting of phenol, phenols substituted by alkyl groups having from 1 to 5 carbon atoms, phenols substituted by chlorine atoms, phenols substituted by bromine atoms, phenols substituted by alkyl groups having from 1 to 5 carbon atoms and chlorine atoms, phenols substituted by alkyl groups having from 1 to 5 carbon atoms and bromine atoms, α-naphthol, β-naphthol, naphthols substituted by alkyl groups having from 1 to 5 carbon atoms, naphthols substituted by chlorine atoms, with a halogenated fatty acid selected from the group consisting of chlorinated, brominated and iodinated fatty acids with 3 to 20 carbon atoms and a solvent for said phenol selected from the group consisting of aliphatic and cycloaliphatic alcohols containing one hydroxyl group and from 3 to 10 carbon atoms, said alcohols being volatile with steam, adding to the mixture an aqueous alkali hydroxide solution in an amount at least sufficient to neutralize the halogenated fatty acid and consequently form the alkali phenolate at a temperature between 90° and 110° C., and after the reaction removing the alcohol by steam distillation.

3. A process as in claim 1 wherein an amount of phenol which is from 10 to 30% in excess of the theoretical amount needed in the reaction is mixed with the halogenated fatty acid.

References Cited in the file of this patent

UNITED STATES PATENTS

| 2,509,772 | Leaper | May 30, 1950 |
| 2,830,083 | Gilbert et al. | Apr. 8, 1958 |

FOREIGN PATENTS

| 690,816 | Great Britain | Apr. 29, 1953 |

UNITED STATES PATENT OFFICE
CERTIFICATE OF CORRECTION

Patent No. 3,054,823            September 18, 1962

Tim Toepel

It is hereby certified that error appears in the above numbered patent requiring correction and that the said Letters Patent should read as corrected below.

Column 4, line 61, for "My" read -- By --; column 6, line 7, for "rist" read -- rise --.

Signed and sealed this 2nd day of April 1963.

(SEAL)
Attest:

ERNEST W. SWIDER           DAVID L. LADD
Attesting Officer           Commissioner of Patents